(12) United States Patent
Rizzo Piazza Roncoroni et al.

(10) Patent No.: US 12,284,248 B2
(45) Date of Patent: *Apr. 22, 2025

(54) SENSORS WITH ENHANCED TIME DIVISION MULTIPLEXING FRAMES

(71) Applicant: STMICROELECTRONICS S.r.l., Agrate Brianza (IT)

(72) Inventors: Alessandra Maria Rizzo Piazza Roncoroni, Abbiategrasso (IT); Matteo Quartiroli, Certosa di Pavia (IT); Paola Baldrighi, Zeccone (IT)

(73) Assignee: STMICROELECTRONICS S.rl., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,692

(22) Filed: Jul. 27, 2023

(65) Prior Publication Data
US 2023/0370524 A1 Nov. 16, 2023

Related U.S. Application Data

(63) Continuation of application No. 17/466,837, filed on Sep. 3, 2021, now Pat. No. 11,757,995.

(60) Provisional application No. 63/180,541, filed on Apr. 27, 2021.

(51) Int. Cl.
*H04L 67/12* (2022.01)
*H04J 3/16* (2006.01)

(52) U.S. Cl.
CPC ............ *H04L 67/12* (2013.01); *H04J 3/1647* (2013.01)

(58) Field of Classification Search
CPC ....... H04L 67/12; H04L 67/104; H04L 67/52; H04L 12/43; H04L 12/40039; H04L 12/40058; H04L 12/40156; H04J 3/1647
See application file for complete search history.

(56) References Cited

U.S. PATENT DOCUMENTS

| | | |
|---|---|---|
| 6,404,780 B1 | 6/2002 | Laturell et al. |
| 7,103,460 B1 | 9/2006 | Breed |
| 7,830,906 B2 | 11/2010 | Satoh et al. |
| 8,310,380 B2 | 11/2012 | Aria et al. |
| 8,433,838 B2 | 4/2013 | Crockett et al. |
| 8,619,821 B2 | 12/2013 | Pan et al. |

(Continued)

FOREIGN PATENT DOCUMENTS

| | | |
|---|---|---|
| CN | 102465834 A | 5/2012 |
| EP | 2854325 A1 | 4/2015 |

(Continued)

*Primary Examiner* — Mewale A Ambaye
(74) *Attorney, Agent, or Firm* — SEED IP LAW GROUP LLP (57) ABSTRACT

The present disclosure is directed to a device and method for generating and transmitting a TDM signal including both raw data and processed data. The device includes a sensor having a time division multiplexing (TDM) interface. The TDM interface transmits both raw data and processed data in a single TDM signal by reserving one or more slots inside a TDM frame for transmission of the processed data. The sensor also embeds additional information inside a data stream of raw data by repurposing one or more of values of the raw data as an exception code, flag, or another type of notification. The device is also enabled to transmit data, and disabled when not in use in order to conserve power.

20 Claims, 6 Drawing Sheets

(56) References Cited

U.S. PATENT DOCUMENTS

| | | |
|---|---|---|
| 9,762,289 B2 | 9/2017 | Henry et al. |
| 10,129,339 B1 | 11/2018 | Boerrigter et al. |
| 10,397,021 B2 | 8/2019 | Kessler et al. |
| 10,675,507 B2 | 6/2020 | Cusey et al. |
| 2006/0022869 A1* | 2/2006 | Zimmerman ........... G01S 19/31 342/458 |
| 2006/0022873 A1* | 2/2006 | Zimmerman ........... G01S 19/41 342/464 |
| 2006/0023678 A1 | 2/2006 | Twitchell, Jr. |
| 2007/0179761 A1 | 8/2007 | Wren et al. |
| 2009/0115658 A1* | 5/2009 | Zimmerman ........... G01S 19/44 342/357.29 |
| 2012/0008787 A1 | 1/2012 | Wan et al. |
| 2012/0272089 A1 | 10/2012 | Hatfield et al. |
| 2013/0322461 A1 | 12/2013 | Poulsen |
| 2014/0047242 A1 | 2/2014 | Ukil et al. |
| 2014/0254431 A1 | 9/2014 | Yan et al. |
| 2014/0297911 A1 | 10/2014 | Kossira et al. |
| 2016/0012390 A1 | 1/2016 | Skaaksrud |
| 2017/0222829 A1* | 8/2017 | Kessler ............. H04L 12/40058 |
| 2017/0300452 A1 | 10/2017 | Leo et al. |
| 2019/0041843 A1 | 2/2019 | Cella et al. |
| 2019/0124235 A1 | 4/2019 | Mitsubayashi et al. |
| 2019/0129405 A1 | 5/2019 | Cella et al. |
| 2019/0349433 A1 | 11/2019 | Smith et al. |
| 2020/0233397 A1 | 7/2020 | Bello et al. |
| 2022/0345525 A1 | 10/2022 | Rizzo Piazza Roncoroni et al. |
| 2024/0072922 A1 | 2/2024 | Quartiroli et al. |

FOREIGN PATENT DOCUMENTS

| | | |
|---|---|---|
| WO | WO 2012134930 A1 | 10/2012 |
| WO | WO 2017062084 A1 | 4/2017 |

\* cited by examiner

SENSORS WITH ENHANCED TIME DIVISION MULTIPLEXING FRAMES

BACKGROUND

Technical Field

The present disclosure is directed to a device and method for transmitting data using time division multiplexing (TDM).

Description of the Related Art

Time division multiplexing (TDM) allows for multiple channels of data to be transmitted on a single data line. TDM interfaces are not standardized, and may vary between different devices. As such, TDM interfaces of different devices may utilize different TDM formats to transmit data.

TDM interfaces are commonly used for audio applications. For instance, many audio devices, such as headphones, include a TDM interface to transfer multiple channels of audio data between components within the device.

Current TDM interfaces are generally unidirectional, and used to transmit raw, unprocessed data, such as raw audio data generated by a microphone. TDM interfaces are typically not used to transmit additional processed data, such as device status information and state information, or read registers of a device through addressing.

BRIEF SUMMARY

The present disclosure is directed to a device including a sensor having a time division multiplexing (TDM) interface. The TDM interface reserves one or more slots inside a TDM frame of a TDM signal for transmission of processed data (e.g., state information, interrupts, function results, etc.), and utilizes the remaining slots inside the TDM frame for transmission of raw data (e.g., acceleration measurements). As a result, the sensor is able to transmit both raw and processed data in a single TDM signal. The transmission might be to other components in the same device or to components outside of the device.

The sensor also embeds additional information inside a data stream of raw data by repurposing one or more of values of the raw data such as an exception code, flag, or another type of notification. The sensor utilizes values at or near a full scale value and a negative full scale value of the raw data to indicate values of the additional information.

The device is also enabled to transmit data, and disabled when not in use in order to conserve power. The device determines whether to enable or disable based on a frame synchronization signal received from a master device. The device may autonomously enable and disable itself once it has been synchronized with the frame synchronization signal.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known communication methods and structures and methods of manufacturing electronic devices and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As audio devices improve and include more advanced features, additional sensors, such as accelerometers, gyroscopes, magnetometers, and proximity sensors, are being embedded in audio devices. Many headphones, for example, include bone conduction accelerometers. These additional sensors generate more advanced data than raw data. For instance, in addition to raw acceleration data, a bone conduction accelerometer may generate and output state information that is determined based on the raw acceleration data (e.g., power state information, orientation information, voice activity detection (VAD) results, etc.). However, as discussed above, current time division multiplexing (TDM) interfaces are configured to transmit raw, unprocessed data, and, thus, are unsuitable for transferring the advanced data generated by these sensors.

The present disclosure is directed to a device and method for generating and transmitting a TDM signal including both raw data and processed data. The device includes a sensor with a TDM interface. In contrast to current TDM interfaces, the TDM interface disclosed herein is embedded in the sensor, and is able to transmit both raw data (e.g., acceleration measurements) and processed data (e.g., state information, interrupts, function results, etc.). The TDM interface reserves and uses one or more slots inside a TDM frame of a TDM signal for transmission of the processed data, and uses the remaining slots inside the TDM frame for transmission of the raw data. As a result, the sensor is able to transmit both raw and processed data in a single TDM signal.

Figure 1:
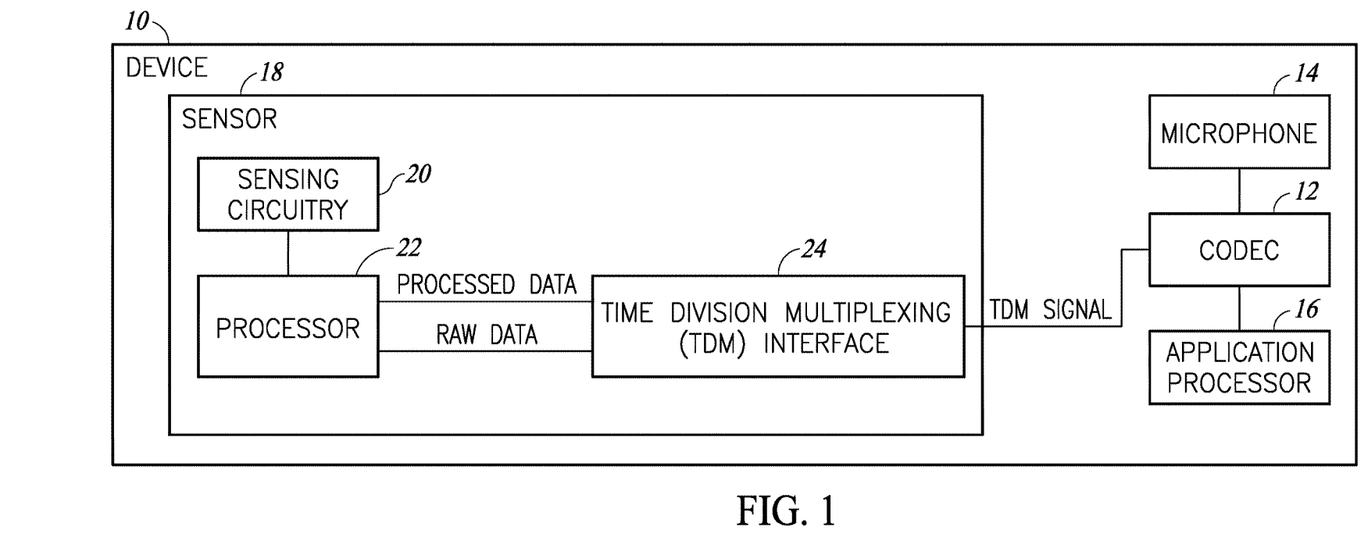
FIG. 1 is a block diagram of a device according to an embodiment disclosed herein.

FIG. 1 is a block diagram of a device 10 according to an embodiment disclosed herein. In one embodiment, the device 10 is an audio headset, such as headphones, a gaming headset, and a telephone headset. The device 10 includes a codec 12, a microphone 14, an application processor 16, and a sensor 18.

The codec 12 is communicatively coupled to the microphone 14, the application processor 16, and the sensor 18. The codec 12 is a program or processor that receives and decodes signals from the microphone 14 and the sensor 18 for further processing. For example, the codec 12 subsequently adjusts or alters a behavior of the device 10 based on the decoded signals. As will be discussed in further detail below, the codec 12 acts as a TDM master for the sensor 18, and the sensor 18 acts as a TDM slave.

The microphone 14 is communicatively coupled to the codec 12. The microphone 14 detects sound, such as a user's voice, and generates an audio signal based on the detected sound. The microphone 14 transmits the audio signal to the codec 12 for further processing. The microphone 14 may provide the audio signal to the codec 12 in the form of an electrical signal.

The application processor 16 is communicatively coupled to the codec 12. The application processor 16 controls the device 10. For example, the application processor 16 may receive the decoded signals from the codec 12, and adjust the device 10 based on the decoded signals. The application processor may be any type of processor, controller, or signal processor that controls the device 10.

The sensor 18 is communicatively coupled to the codec 12. The sensor 18 measures a physical property of the device 10 or a surrounding environment. In one embodiment, the sensor 18 is a sensor that has an accelerometer that measures acceleration of the device 10 along at least one axis (e.g., a 3-axis accelerometer, a 6-axis accelerometer, a sensor including an accelerometer and a gyroscope, or a sensor including an accelerometer and a magnetometer). For example, the sensor 18 may be a bone conduction accelerometer that measures accelerations of the device 10 caused by bone vibration signals propagating through the human body, and generates acceleration signals that indicates the measured accelerations. The sensor 18 may also be another type of sensor, such as a gyroscope, magnetometer, a proximity sensor, a pressure sensor, a temperature sensor, and a sensor that includes multiple different types of sensors. In one embodiment, the sensor 18 is a micro-electromechanical system (MEMS) sensor. The sensor 18 includes sensing circuitry 20, a processor 22, and a TDM interface 24.

The sensing circuitry 20 is communicatively coupled to the processor 22. The sensing circuitry 20 detects or measures the physical property of the device 10 or the surrounding environment, and provides the measurements to the processor 22. For example, in an embodiment where the sensor 18 is an accelerometer, the sensing circuitry 20 measures an acceleration of the device along at least one axis, and transmits the measured acceleration to the processor 22. The sensing circuitry 20 may provide the measured physical property to the processor 22 in the form of an electrical signal.

The processor 22 is communicatively coupled to the sensing circuitry 20 and the TDM interface 24. The processor 22 receives the measurements from the sensing circuitry 20, and generates a plurality of parameters of the device 10 based on the measurements received form the sensing circuitry 20. The processor 22 may be any type of processor, controller, or signal processor that controls and processes data for the sensor 18.

The plurality of parameters may include interrupts, commands, values, and function results generated using the measurements generated by the sensing circuitry 20. The plurality of parameters may also include status and state information detected using the measurements generated by the sensing circuitry 20.

In an embodiment where the device 10 is an audio headset and the sensor 18 is an accelerometer, the plurality of parameters include one or more of the following parameters: a general processor configuration or command to instruct the codec 12 or the application processor 16 to set the configuration or execute the command, full-scale information that indicates a range of measurements generated by the sensor 18, sleep state information that instructs the codec 12 or the application processor 16 to set the device 10 to a sleep or low power state, free fall state information that indicates whether or not the device 10 is in a falling or dropping state, wake up information that instructs the codec 12 or the application processor 16 to set the device 10 to an awake or powered state, z-axis up/down information that indicates whether there is up and down movement along the z-axis, y-axis up/down information that indicates whether there is up and down movement along the y-axis, x-axis up/down information that indicates whether there is up and down movement along the x-axis, double tap information that indicates whether or not a double tap on the device 10 by a user is detected, and single tap information that indicates whether or not a single tap on the device 10 by user is detected.

Each of the plurality of parameters is determined or calculated based on the measurements received from the sensing circuitry 20. For instance, the processor 22 may set the sleep state information to instruct the codec 12 or the application processor 16 to set the device 10 in a sleep or low power state in response to determining the measured accelerations are less than a threshold value, set the free fall state information to indicate the device 10 is in a falling or dropping state in response to determining the measured accelerations are greater than a threshold value, set the wake up information to instruct the codec 12 or the application processor 16 to set the device 10 in an awake or powered state in response to determining the measured accelerations are greater than a threshold value, set the z-axis up/down information to indicate there is up and down movement along the z-axis in response to determining the measured accelerations along the z-axis are greater than a threshold value in two different directions, set the y-axis up/down information to indicate there is up and down movement along the y-axis in response to determining the measured accelerations along the y-axis are greater than a threshold value in two different directions, set the x-axis up/down information to indicate there is up and down movement along the x-axis in response to determining the measured accelerations along the x-axis are greater than a threshold value in two different directions, set the double tap information to indicate detection of a double tap on the device 10 in response to determining measured accelerations are greater than a threshold value in a first time period and a second time period, and set the single tap information to indicate detection of a single tap on the device 10 in response to determining measured accelerations are greater than a threshold value in a first time period.

The processor 22 transmits the measurements generated by the sensing circuitry 20 and the plurality of parameters determined by the processor 22 to the TDM interface 24. In one embodiment, the sensing circuitry 20 transmits the measurements directly to the TDM interface 24.

The measurements transmitted by the processor 22 are raw or primary data. Stated differently, the processor 22 does not perform any processing or calculations on the measurements generated by the sensing circuitry 20, and provides the measurements directly to the TDM interface 24 as unprocessed data. For example, in an embodiment where the sensor 18 is an accelerometer, the acceleration measurements generated by the sensing circuitry 20 is raw data.

In contrast to the measurements, the plurality of parameters transmitted by the processor 22 is processed or secondary data. Stated differently, the plurality of parameters are data that is processed from the measurements generated by the sensing circuitry 20, which is raw data. For example, in the embodiment where the device 10 is an audio headset and the sensor 18 is an accelerometer, the general processor configuration or command, the full-scale information, the sleep state information, the free fall state information, the wake up information, the z-axis up/down information, the y-axis up/down information, the x-axis up/down information, the double tap information, and the single tap information are processed data.

Accordingly, the processor 22 provides both processed data (e.g., the plurality of parameters) and raw data (e.g., the measurements generated by the sensing circuitry 20) to the TDM interface 24.

In the embodiment shown in FIG. 1, the processor 22 generates a plurality of parameters of the device 10 based on the measurements received from the sensing circuitry 20. In another embodiment, the processor 22 transmits the measurements received from the sensing circuitry 20 to a second processor included in the sensor 18. The second processor then generates the plurality of parameters of the device 10 based on the measurements, and transmits the plurality of parameters determined by the second processor to the TDM interface 24. The second processor may be a dedicated processor for the generation of parameters.

The TDM interface 24 is communicatively coupled to the processor 22 and the codec 12. The TDM interface 24 transmits multiple pieces of data over a common data line or channel by using time division multiplexing. The TDM interface 24 divides the common data line into a plurality of slots or segments along the time axis, and transmits a piece of data in each of the plurality of slots. A set of slots is sometimes called a TDM frame.

The TDM interface 24 receives the plurality of parameters, which is processed data, and the measurements generated by the sensing circuitry 20, which is raw data, from the processor 22; and transmits the plurality of parameters and the measurements to the codec 12 in a TDM signal. The TDM interface 24 may also transmit the TDM signal, including the plurality of parameters and the measurements, to other components within the device 10 (e.g., the application processor 16) and external to the device 10.

The plurality of parameters and the measurements are transmitted to the codec 12 in a single TDM signal. The TDM interface 24 concatenates the plurality of parameters and the measurements for transmission on the TDM signal by dividing the TDM signal into a plurality of slots or segments along the time axis, and transmitting the plurality of parameters and the measurements in respective slots of the plurality of slots. In one embodiment, the plurality of parameters and the measurements are transmitted in a single TDM frame.

Figure 2:
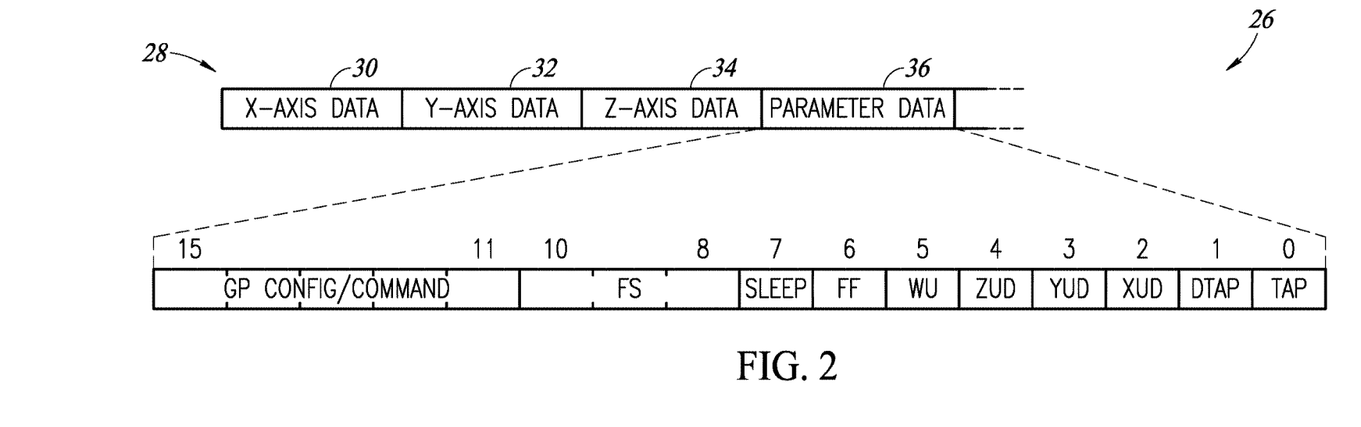
FIG. 2 is a time division multiplexing (TDM) signal according to an embodiment disclosed herein.

FIG. 2 is a TDM signal 26 according to an embodiment disclosed herein. The TDM signal includes a plurality of time slots 28. In one embodiment, the time slots 28 have the same length. Although four time slots are shown in FIG. 2, the TDM signal 26 may include any number of time slots.

In the embodiment shown in FIG. 2, the device 10 is an audio headset and the sensor 18 is a 3-axis accelerometer. In this embodiment, the measurements generated by the sensing circuitry 20 are acceleration measurements. The plurality of parameters include the general processor configuration or command, full-scale information, sleep state information, free fall state information, wake up information, z-axis up/down information, y-axis up/down information, x-axis up/down information, double tap information, and single tap information, as discussed above.

The acceleration measurements generated by the sensing circuitry 20 are positioned in respective slots of the time slots 28. For example, as shown in FIG. 2, x-axis data that includes an acceleration measurement along an x-axis is positioned in a time slot 30, y-axis data that includes an acceleration measurement along a y-axis is positioned in a time slot 32, and z-axis data that includes an acceleration measurement along a z-axis is positioned in a time slot 34.

The plurality of parameters generated by the processor 22 are also positioned in a respective slot of the time slots 28.

In one embodiment, each of the plurality of parameters are positioned in respective slots of the time slots 28. That is, a single parameter is positioned in a single slot of the time slots 28.

In another embodiment, all of the plurality of parameters are positioned in a single time slot. For example, as shown in FIG. 2, parameter data, which includes the plurality of parameters determined by the processor 22, is positioned in a time slot 36.

The time slot 36 is an advanced time slot that is reserved for transmission of processed data. In the embodiment shown in FIG. 2, the time slot 36 is a 16 bit slot, and one or more bits of the 16 bit slot represents a single parameter. The value of bit 0 indicates the single tap information, the value of bit 1 indicates the double tap information, the value of bit 2 indicates the x-axis up/down information, the value of bit 3 indicates the y-axis up/down information, the value of bit 4 indicates the z-axis up/down information, the value of bit 5 indicates the wake up information, the value of bit 6 indicates the free fall state information, the value of bit 7 indicates sleep state information, the value of bits 8 through 10 indicates the full-scale information, and the value of bits 11 through 16 indicates the general processor configuration or command. Other mappings of the parameters to the bits of a time slot are also possible. Further, each of the time slots 28 may include any number of bits (e.g., 8 bits, 32 bits, 64 bits). In one embodiment, the time slots 30, 32, 34, 36 form a single TDM frame.

Time slots in the TDM signal are reserved in advance. For example, the positions of the x-axis data in the time slot 30, the y-axis data in the time slot 32, and the z-axis data in the time slot 34, and the parameter data in the time slot 36 are programmed in the codec 12 and the TDM interface 24 prior to the TDM interface 24 transmitting the TDM signal. In one embodiment, the sensor 18, itself, determines and reserves the positions of data in the TDM signal, and informs the codec 12 of the locations of data in the TDM signal.

The sensor 18 acts as a TDM slave, and the codec 12 acts as a TDM master. The TDM interface 24 transmits the TDM signal to the codec 12. Upon receiving the TDM signal from the TDM interface, the codec 12 decodes the TDM signal, and utilizes the decoded TDM signal for further processing.

In one embodiment, the codec 12 decodes received signals (e.g., the TDM signal from the processor 22 and the audio signal from the microphone 14), and adjusts or alters a behavior of the device 10 based on the decoded signals. For example, in an embodiment where the device 10 is an audio headset and the sensor 18 is an accelerometer, the codec 12 executes the general processor configuration or command; sets the device 10 to a sleep or low power state based on the sleep state information; issues a warning based on the free fall state information; sets the device 10 to an awake or powered state based on the wake up information; adjusts settings of the device 10 based z-axis up/down information, y-axis up/down information, and x-axis up/down information; and executes different commands based on the double tap information and the single tap information. In one embodiment, the codec 12, itself, alters behavior of the device 10 based on the decoded signals. In another embodiment, the codec 12 transmits the decoded signals to the application processor 16, which then alters behavior of the device 10 based on the decoded signals.

Although a single sensor is shown in FIG. 1, the device 10 may include any number of sensors. For example, the device 10 may include a gyroscope, a magnetometer, a proximity sensor, a pressure sensor, and a temperature sensor. Other types of sensors are also possible. In one embodiment, the sensors included in the device 10 share the same TDM interface, and are assigned the same reserved time slot. For instance, the sensors take turns using the time slot 36 to transmit parameter data. In another embodiment, each of the sensors included in the device 10 have their own reserved time slot in the TDM signal to transmit parameter data.

Figure 3:
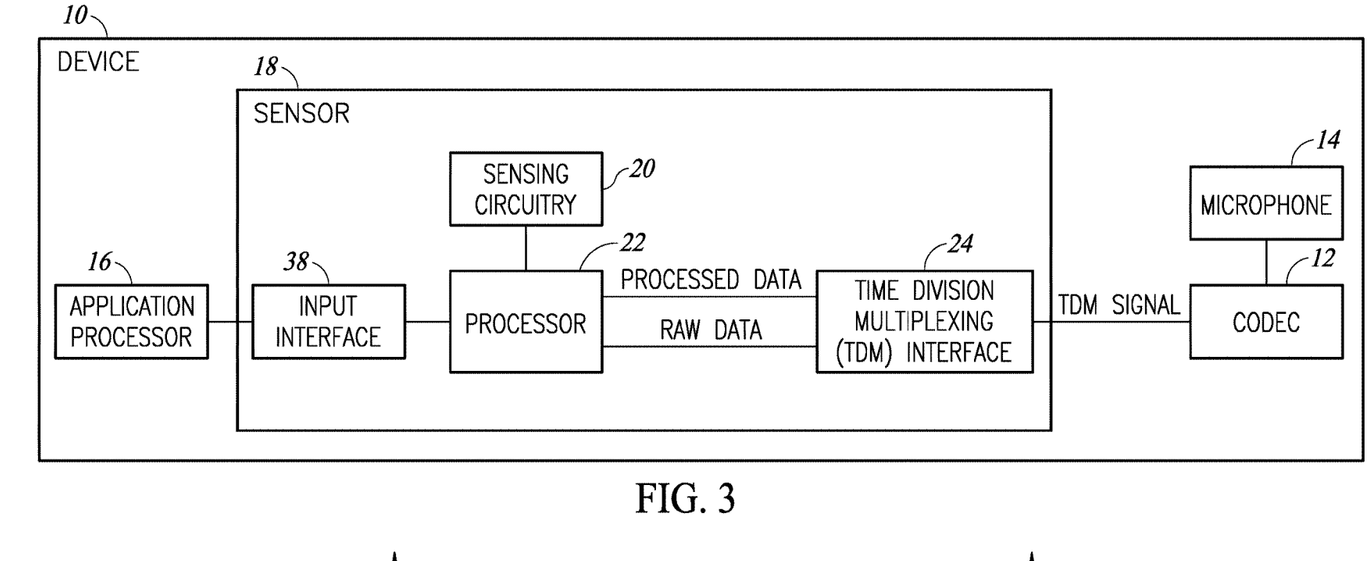
FIG. 3 is a block diagram of a device according to another embodiment disclosed herein.

As the sensor 18, more specifically the TDM interface 24, is able to transmit data beyond simple raw measurement data, the sensor 18 may be used as a pass-through for other components within the device 10. FIG. 3 is a block diagram of the device 10 according to another embodiment disclosed herein.

Similar to the embodiment shown in FIG. 1, the device 10 shown in FIG. 3 includes the codec 12, the microphone 14, the application processor 16, and the sensor 18; and the sensor includes the sensing circuitry 20, the processor 22, and the TDM interface 24. However, in contrast to the embodiment shown in FIG. 1, the sensor 18 is positioned between the codec 12 and the application processor 16. Further, the sensor 18 includes an input interface 38 that receives data from the application processor 16.

In the embodiment shown in FIG. 3, the sensor 18 acts as a pass-through for the application processor 16. The sensor 18 receives data from the application processor 16 via the input interface 38, and forwards the data to the codec 12 unaltered. As a result, the device 10 does not have to include a dedicated bus between the application processor 16 and the codec 12, as data can be passed through the sensor 18. The sensor 18 transmits the application processor data to the codec 12 in a slot reserved for processed data, such as the time slot 36 shown in FIG. 2.

In one embodiment, the sensor 18 writes or stores the application processor data in an internal memory of the sensor 18, such as internal registers of the processor 22. Subsequently, the processor 22 reads or retrieves the application processor data from the internal memory, and provides the data to the TDM interface 24 for transmission to the codec 12. The TDM interface 24 then transmits the application processor data to the codec 12.

The sensor 18 may act as a pass-through for other components in the device 10 as well. For example, the sensor 18 may be used as a pass-through between the microphone 14 and the codec 12. In this case, the sensor 18 receives audio signals from the microphone 14, and forwards the audio signals, unaltered, to the codec 12 for further processing.

The sensor 18 may also embed additional information inside the data stream of raw data by repurposing one or more values of the raw data as an exception code, flag, or notification.

Exception codes, for example, are implemented by utilizing predetermined values of the raw data as the exception codes, themselves. Upon receiving a raw data value that is reserved as an exception code from the sensor 18, a component of the device 10 (e.g., the codec 12 and the application processor 16) is notified of an occurrence of an event, status, or error represented by the exception code. For example, the exception code may indicate that the sensor 18 is currently processing data, indicate that an output of the sensor 18 is currently invalid, or be used as a sensor self-test. The component may then perform further processing based on the exception code. For example, the codec 12 or the application processor 16 may restart the device 10 upon receiving an exception code indicating a system error. In one embodiment, the sensor 18, more specifically the processor 22, determines whether or not the exception code should be generated based on measurements generated by the sensing circuitry 20.

The raw data values that are reserved as, for example, exception codes are at or near the full scale value or the negative full scale value of the raw data. The full scale value and the negative full scale value are the maximum value and the minimum value, respectively, that the raw data can have. For example, in a case where the raw data is a two's complement 16 bit value, the full scale value of the raw data is 32767 (0111111111111111 in binary), and the negative full scale value of the raw data is −32768 (1000000000000000 in binary).

Figure 4A:
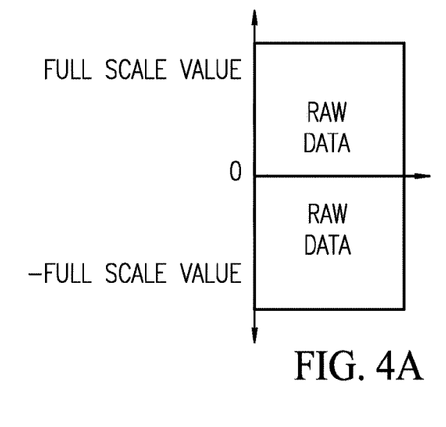
FIG. 4A is raw data according to an embodiment disclosed herein.
Figure 4B:
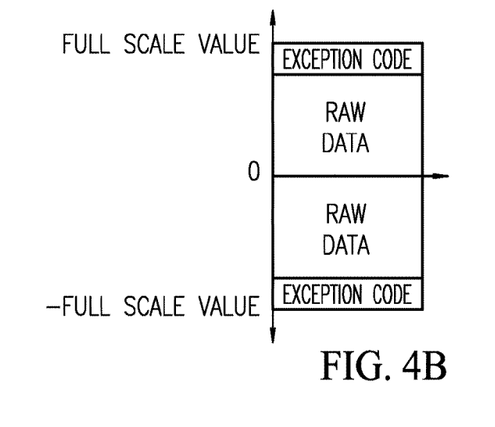
FIG. 4B is raw data with exception codes according to an embodiment disclosed herein.

FIG. 4A is raw data according to an embodiment disclosed herein, and FIG. 4B is raw data with exception codes according to an embodiment disclosed herein. In FIG. 4A, the raw data is unmodified. For example, in the embodiment shown in FIG. 2 where the sensor 18 is an accelerometer, the raw data is the x-axis data in the time slot 30, the y-axis data in the time slot 32, or the z-axis data in the time slot 34. In FIG. 4B, values of the raw data at the full scale value and the negative full scale value are used as exception codes. Remaining values of the raw data are used as measurement values (e.g., acceleration measurements).

Multiple values at or near the full scale value or the negative full scale value may be used as an exception code, flag, or notification. For example, in a case where the raw data is a two's complement 16 bit value, the value 32767 (0111111111111111 in binary), which is the full scale value, may be used as a first exception code; and the value −32768 (1000000000000000 in binary), which is the negative full scale value, may be used as a second exception code different from the first exception code. The value −32767 (1000000000000001 in binary), which is the value closest to the negative full scale value of the raw data, may be also used as a third exception code different from the first and second exception codes. In this example, three different values of the raw data are used as exception codes. However, any number of values at or near the full scale value or the negative full scale value may be used as an exception code.

Utilizing values at or near the full-scale values of the raw data lowers the impact on the raw data because these values are less likely to be used by the sensor 18. For example, in a case where the sensor 18 is an accelerometer, it is less likely the acceleration measurements will reach the maximum or minimum values of the raw data. In addition, by repurposing raw data values, additional secondary interfaces and lines for transmission of exception codes, flags, or notifications do not need to be included in the sensor 18 and the device 10.

It is noted that the device 10 (e.g., the codec 12 and the application processor 16) does not utilize raw data values that have been repurposed as, for example, exception codes as measurement data. For example, in a case where the sensor 18 is an accelerometer, the device 10 does not consider a raw data value that is used as an exception code as an acceleration measurement.

In one embodiment, a single piece of additional information is inserted into each data stream of raw data outputted by the sensor 18. For example, referring to the embodiment shown in FIG. 2 in which the sensor 18 is a 3-axis accelerometer, a single raw data value of each of the x-axis data in the time slot 30, the y-axis data in the time slot 32, and the z-axis data in the time slot 34 is repurposed as an exception code. For example, where the raw data is a two's complement 16 bit value, the value, −32768 (1000000000000000 in binary) in each of the x-axis data, the y-axis data, and the z-axis data is used as an exception code. As a result, the impact of the modification of the raw data is minimized because just a single value in each of the x-axis data, the y-axis data, and the z-axis data is no longer used as an acceleration measurement. The remaining values in each of the x-axis data, the y-axis data, and the z-axis data may still be used as acceleration measurements.

In one embodiment, raw data values are reserved in advance. For example, the codec 12 and the TDM interface 24 are programed to utilize the value 32767 (0111111111111111 in binary) and the value −32768 (1000000000000000 in binary) as exception codes prior to the TDM interface 24 transmitting the TDM signal. In one embodiment, the sensor 18, itself, determines and reserves values of raw data to be used as, for example, exception codes; and informs the codec 12 of the values being used as the exception codes.

In one embodiment, the codec 12 instructs the sensor 18 to enable and disable the repurposing of values of raw data as an exception code, flag, or notification. When enabled, the sensor 18 utilizes one or more raw data values as an exception code, flag, or notification, as discussed above. When disabled, the sensor 18 does not utilize any raw data value as an exception code, flag, or notification. Instead, all of the raw data values are used as measurement values, such as acceleration measurement values.

Figure 5:
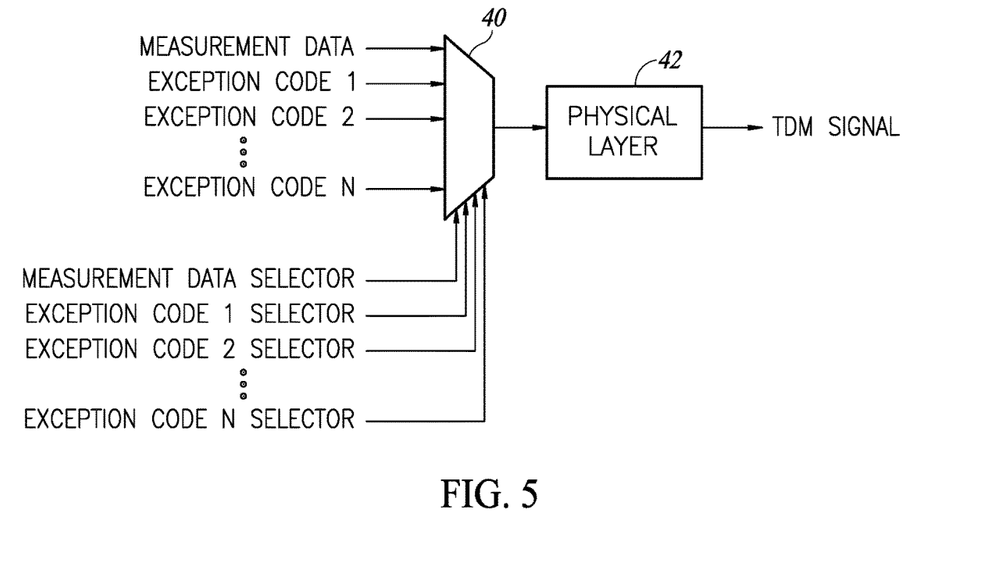
FIG. 5 is a multiplexer according to an embodiment disclosed herein.

In one embodiment, the sensor 18 includes a multiplexer to select between measurement data and the exception code, flag, or notification. FIG. 5 is a multiplexer 40 according to an embodiment disclosed herein.

The multiplexer 40 selects between inputs that receive measurement data and a plurality of exception codes, and forwards the selected input to a physical layer 42 of the sensor 18 for transmission. In response to the multiplexer 40 receiving a measurement data selection signal, the multiplexer 40 selects and forwards measurement data (e.g., acceleration measurements) to the physical layer 42 for transmission. In response to the multiplexer 40 receiving an exception code selection signal, the multiplexer 40 selects and forwards the corresponding exception code (e.g., values 32767, −32768, and −32767) to the physical layer 42 for transmission. In one embodiment, the physical layer 42 includes the TDM interface 24 discussed above.

Figure 6:
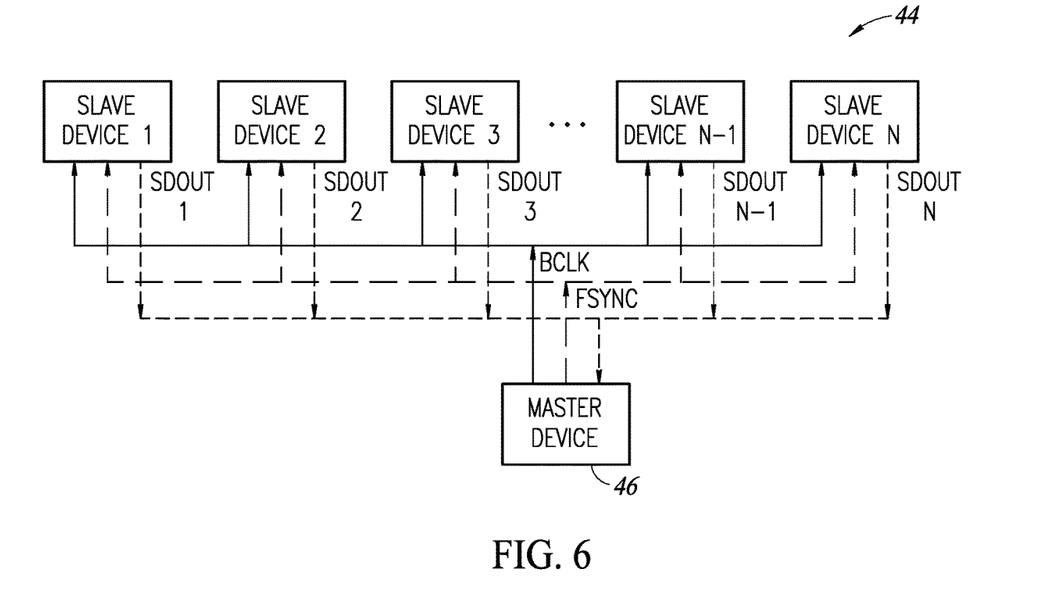
FIG. 6 is a block diagram of a plurality of slave devices and a master device according to an embodiment disclosed herein.

TDM interfaces also allow for multiple channels of data to be transmitted between devices on a single, shared data line. FIG. 6 is a block diagram of a plurality of slave devices 44 and a master device 46 according to an embodiment disclosed herein. The master device 46 is communicatively coupled to each of N number of slave devices 44. N may be equal to any positive integer number.

Each of the plurality of slave devices 44 and the master device 46 may be the device 10 discussed above or any type of electronic device with a TDM interface, such as an audio headset, such as headphones, a gaming headset, and a telephone headset. The plurality of slave devices 44 and the master device 46 may also be internal components within a single electronic device.

Each of the slave devices 44 transmit data to the master device 46 on a shared data line via a TDM interface, and the master device 26 collects the data from the slave devices 44 for further processing. For example, Slave Device 1, Slave Device 2, Slave Device 3, Slave Device N−1, and Slave Device N outputs data SDOUT 1, SDOUT 2, SDOUT 3, SDOUT N−1, and SDOUT N, respectively, to the master device 46. The data may be any type of data, such as audio data or the TDM signal discussed above.

The master device 46 provides a bit clock signal BCLK and a frame synchronization signal FSYNC to each of the slave devices 44.

The bit clock signal BCLK is a clock signal, typically a square wave, used by the slave devices 44 to synchronize their transmission of bits of data to the master device 46. Each of the slave devices 44 synchronizes their own internal counter with the bit clock signal BCLK, and transmits one bit of data at each count of the internal counter. A slave device synchronizes its internal counter at each rising edge (i.e., a transition from a low state (e.g., amplitude of 0 to 2 volts) to a high state (e.g., amplitude of 3 to 5 volts)) or falling edge (i.e., a transition from a high state to a low state) of the bit clock signal BCLK.

The frame synchronization signal FSYNC is used by the slave devices 44 to synchronize transmission of frames of data. The master device 46 transmits the frame synchronization signal FSYNC to the slave devices 44 periodically or at regular equal time intervals. The plurality of slave devices 44 transmit data in respective transmission slots or channels with a single frame of data. For example, Slave Device 1 to Slave Device N each take turns transmitting data in a single frame and on the shared data line. A frame is initiated and transmission of data from a first slave device (e.g., Slave Device 1) of the slave devices 44 is started upon the slave devices 44 receiving the frame synchronization signal FSYNC.

Figure 7:
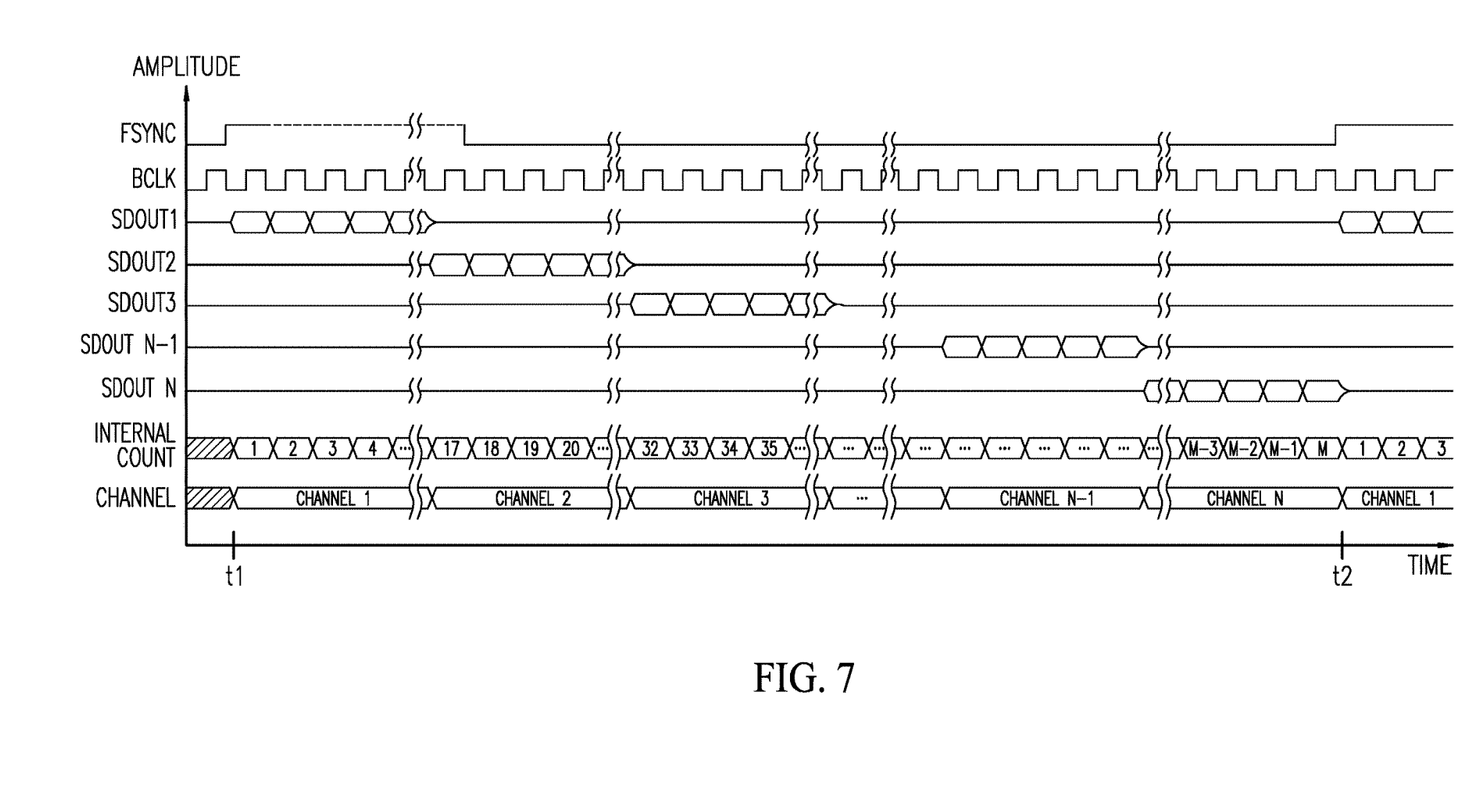
FIG. 7 is a timing diagram of a plurality of slave devices and a master device according to an embodiment disclosed herein.

At a system level, the total number of transmission slots or channels in a frame, the relative positions of the slots in the frame, and the length of each of the slots are assigned to each of the slave devices 44 prior to transmission. The slave devices 44 recognize when a frame is initiated and their turn to transmit data within the frame based on the frame synchronization signal FSYNC and the bit clock signal BCLK. For example, FIG. 7 is a timing diagram of the plurality of slave devices 44 and the master device 46 according to an embodiment disclosed herein. The vertical axis is an amplitude axis, and the horizontal axis is a time axis. The amplitude axis may have any type of amplitude unit (e.g., volts, amps, etc.), and the time axis may have any type of time unit (e.g., milliseconds, seconds, etc.).

At time t1, the slave devices 44 receive the frame synchronization signal FSYNC from the master device 46. In response, a frame of data is initiated and data transmission from the slave devices 44 in their respective slots or channels begin. In the embodiment shown in FIG. 7, the slave devices 44 are pre-assigned to transmit in the order of Slave Device 1, Slave Device 2, Slave Device 3, . . . Slave Device N–1, and Slave Device N in a frame. The data transmissions by Slave Device 1, Slave Device 2, Slave Device 3, Slave Device N–1, and Slave Device N are data Channel 1, Channel 2, Channel 3, Channel N–1, and Channel N, respectively. In one embodiment, the master device 46 assigns the order of the slave devices 44, and informs the slave devices 44 of the order. In another embodiment, the slave devices 44 and the master device 46 are preprogrammed with the order of the slave devices 44.

As discussed above, each of the slave devices 44 synchronizes an internal counter with the bit clock signal BCLK, to determine when their slot begins and ends within a frame. The slave devices 44 transmit a single bit of data at each count of their respective internal counters. In the embodiment shown in FIG. 7, each of the slave devices 44 are assigned to transmit 16 bits of data, and a total of M bits of data are transmitted by Slave Device 1, Slave Device 2, Slave Device 3, Slave Device N–1, and Slave Device N. M may be equal to any positive integer number (e.g., 128, 256, etc.). Stated differently, each transmission slot or channel is 16 bits long, and a frame of data is M bits long. In one embodiment, the master device 46 assigns the total number of bits to be transmitted by each of the slave devices 44, and informs the slave devices 44 of the total number of bits. In another embodiment, the slave devices 44 and the master device 46 are preprogrammed with the total number of bits to be transmitted by each of the slave devices 44.

Once a slave device has transmitted 16 bits of data, the next slave device begins transmission. For example, Slave Device 2 begins transmission of data SDOUT2 after Slave device 1 finishes transmitting 16 bits of data SDOUT1. When a slave device's transmission slot ends, the slave device sets its data line output to be in a high impedance state to allow line driving and data transmission from the remaining slave devices. In the embodiment shown in FIG. 7, each of the slave devices 44 finishes transmission and is set to a high impedance state once 16 bits of data is transmitted.

At time t2, the last Slave Device N finishes transmitting SDOUT N, and the frame ends. A total of M bits of data have been transmitted by Slave Device 1, Slave Device 2, Slave Device 3, Slave Device N–1, and Slave Device N. In addition, the slave devices 44 receive the frame synchronization signal FSYNC from the master device 46 again. The next frame of data begins and data transmission from the slave devices 44 repeats.

In order to conserve power, each of the slave devices 44 is enabled to transmit data, and disabled when not in use. When enabled, a TDM interface of the slave device is powered on and operational. When disabled, the TDM interface of the slave device is powered off (or in a low power state) and non-operational.

Since TDM interfaces are unidirectional interfaces, the master device 46 is unable to perform addressed reading or writing to each of the slave devices 44. As such, each of the slave devices 44 determine when to be enabled and disabled.

Figure 8:
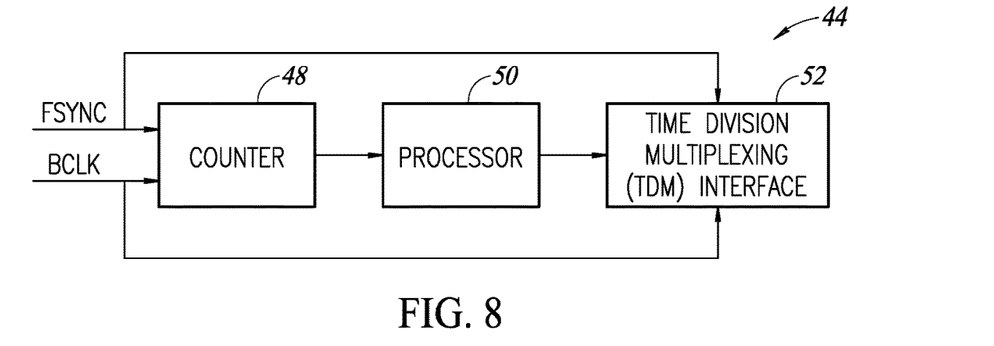
FIG. 8 is a block diagram of a slave device according to an embodiment disclosed herein.

In one embodiment, each of the slave devices 44 relies on the frame synchronization signal FSYNC in order to enable and disable itself. By utilizing the frame synchronization signal FSYNC, a slave device may autonomously enable and disable itself once it has been synchronized with the frame synchronization signal FSYNC. FIG. 8 is a block diagram of a slave device 44 according to an embodiment disclosed herein. The slave device 44 includes a counter 48, a processor 50, and a TDM interface 52.

The counter 48 detects and counts presences and absences of the frame synchronization signal FSYNC. The counter 48 may be implemented as circuitry or as a software module executed by the processor 50. Although the counter 48 is shown a separate component from the processor 50 in FIG. 8, the counter 48 and the processor 50 may be a single component.

In a case where the slave device 44 is currently disabled, the counter 48 performs detection of the frame synchronization signal FSYNC, and maintains a total count of frame synchronization signal FSYNC detections. For example, referring to FIG. 7, the counter 48 detects and counts the frame synchronization signal FSYNC present at times t1 and t2. It is noted that each of the slave device's 44 total count of frame synchronization signal FSYNC detections will be the same because the slave devices 44 receive and are synchronized with the same frame synchronization signal FSYNC from the master device 46.

In a case where the slave device 44 is currently enabled, the counter 48 detects absences of the frame synchronization signal FSYNC, and maintains a total count of frame synchronization signal FSYNC absences. The slave device 44 is able to detect an absence of the frame synchronization signal FSYNC because the slave device 44 is synchronized with the frame synchronization signal FSYNC from the master device 46, and expects to receive the frame synchronization signal FSYNC periodically or at regular equal time intervals. As such, after detecting one frame synchronization signal, the slave device 44 expects another frame synchronization signal FSYNC at the next time interval. If the slave device 44 does not detect a frame synchronization signal FSYNC at the next time interval, the counter 48 detects and counts an absence of the frame synchronization signal FSYNC. Additionally, the slave device 44 knows the length of a frame of data. After detecting one frame synchronization signal FSYNC, the slave device 44 expects another frame synchronization signal FSYNC at the end of every frame of data. For example, referring to FIG. 7, the frame of data initiated at time t1 is M bits long, and the slave devices 44 expects another frame synchronization signal FSYNC every M bits (e.g., at time t2). If the slave device 44 does not detect a frame synchronization signal FSYNC at the end of a frame of data, the counter 48 detects and counts an absence of the frame synchronization signal FSYNC. It is noted that each of the slave device's 44 total count of frame synchronization signal FSYNC absences will be the same because the slave devices 44 receive and are synchronized with the same frame synchronization signal FSYNC from the master device 46.

Operation of the counter 48 will be discussed in further detail below.

The processor 50 determines whether to enable the slave device 44 based on the total count of frame synchronization signal FSYNC detections, and determines whether to disable the slave device 44 based on the total count of frame synchronization signal FSYNC absences. The processor 50 may be any type of processor, controller, or signal processor that performs computations and controls the slave device 44.

In the case where the slave device 44 is currently disabled, the processor 50 determines to enable the slave device 44 in response to the total count of frame synchronization signal FSYNC detections being greater than or equal to a threshold value. Upon determining to enable the slave device 44, the processor 50 enables the slave device 44 by instructing the TDM interface 52 to be powered on and operational.

In the case where the slave device 44 is currently enabled, the processor 50 determines to disable the slave device 44 in response to the total count of frame synchronization signal FSYNC absences being greater than or equal to a threshold value. Upon determining to disable the slave device 44, the processor 50 disables the slave device 44 by instructing the TDM interface 52 to be powered off or enter a low power state.

Operation of the processor 50 will be discussed in further detail below.

The TDM interface 52 transmits data to the master device 46 on the shared data line. As discussed above, the TDM interface 52 utilizes both the bit clock signal BCLK and the frame synchronization signal FSYNC to transmit data. The TDM interface 52 may be any type of interface that utilizes time division multiplexing to transmit data, such as the TDM interface 24 discussed above.

Figure 9:
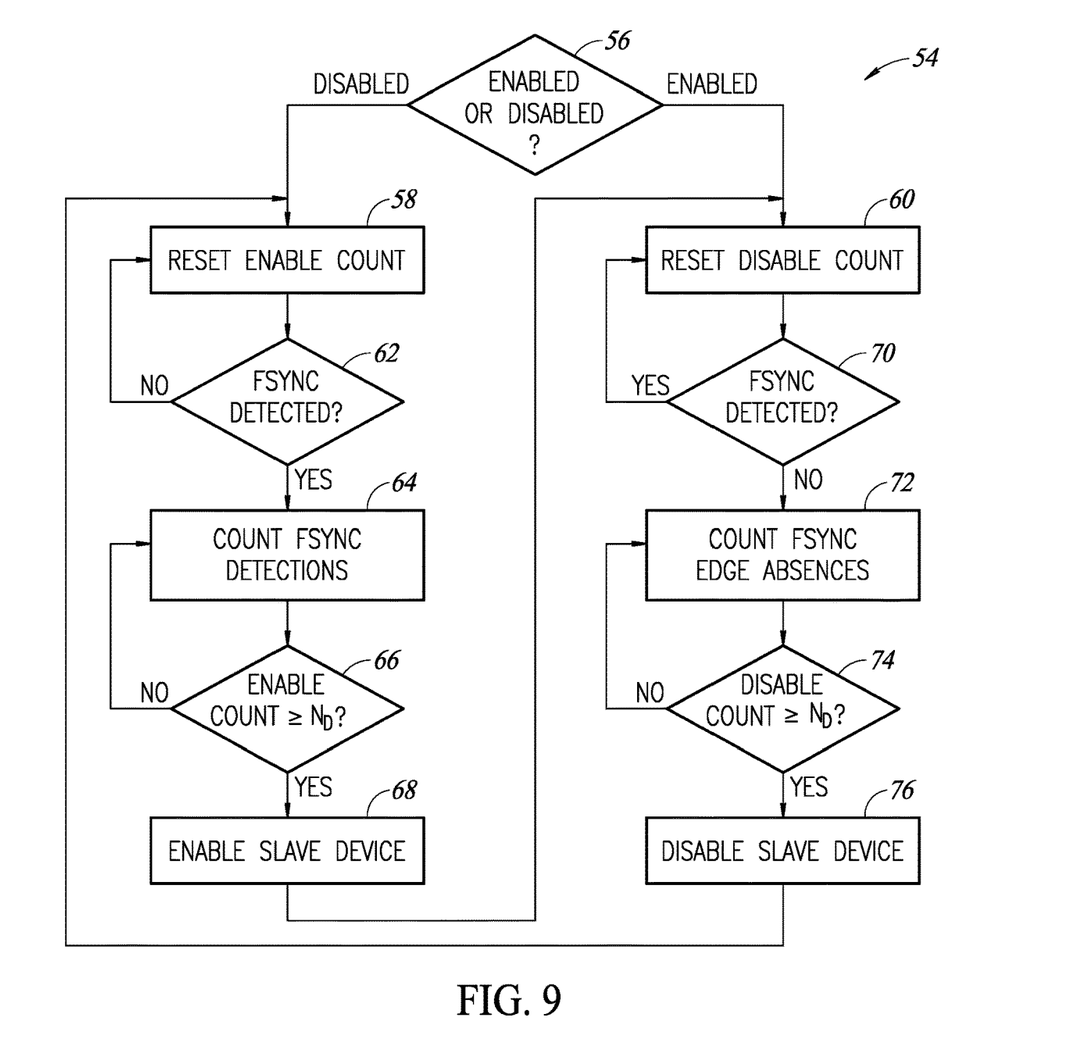
FIG. 9 is a flow diagram of a method of enabling and disabling a slave device according to an embodiment disclosed herein.

FIG. 9 is a flow diagram of a method 54 of enabling and disabling the slave device 44 according to an embodiment disclosed herein.

In block 56, the slave device 44 determines whether the TDM interface 52 is currently enabled or disabled. Block 56 may be performed by the counter 48 or the processor 50. If the TDM interface 52 is currently disabled, the method 54 moves to block 58. If the TDM interface 52 is currently disabled, the method 54 moves to block 60. In block 58, the counter 48 sets or resets an enable count to zero. The enable count is used to track a total count of frame synchronization signal FSYNC detections, which is discussed above. The method then moves to block 62

In block 62, the counter 48 performs detection of the frame synchronization signal FSYNC. If the frame synchronization signal FSYNC is not detected (i.e., the slave device 44 has not received the frame synchronization signal FSYNC from the master device 46), the method 54 returns to block 58. If the frame synchronization signal FSYNC is detected (i.e., the slave device 44 has received the frame synchronization signal FSYNC from the master device 46), the method 54 moves to block 64.

In block 64, the counter 48 increments the enable count to count the frame synchronization signal FSYNC detected in block 62, and continues to perform detection of the frame synchronization signal FSYNC. As discussed above, the enable count indicates a total count of frame synchronization signal FSYNC detections. If the frame synchronization signal FSYNC is not detected, the counter 48 continues to perform detection of the frame synchronization signal FSYNC. If the frame synchronization signal FSYNC is detected, the counter 48 increments the enable count. The method 54 moves to block 66 after the enable count has been incremented.

In one embodiment, the slave device 44 does not receive the frame synchronization signal FSYNC and the bit clock signal BCLK when disabled. As such, the counter 48 is unable to perform detection of the frame synchronization signal FSYNC as discussed above. In this case, the slave device 44 maintains an internal frame synchronization signal that is synchronized with the frame synchronization signal FSYNC. For example, the internal frame synchronization signal may be a clock signal in which a high state represents the frame synchronization signal FSYNC is received and a low state represents the frame synchronization signal FSYNC has not been received. The internal frame synchronization signal is generated by a local oscillator embedded in the slave device 44. The counter 48 utilizes the internal frame synchronization signal in place of the frame synchronization signal FSYNC in blocks 62 and 64. Namely, the counter 48 performs detection of the internal frame synchronization signal, and increments the enable count each time the internal frame synchronization signal is detected (e.g., each time the internal frame synchronization signal has a high state). In one embodiment, the internal clock is synchronized with the frame synchronization signal FSYNC each time the slave device 44 is enabled and begins to receive the frame synchronization signal FSYNC again (e.g., in block 68).

In block 66, the processor 50 determines whether the enable count is greater than or equal to an enable threshold value NE. The enable threshold value NE may be configured based on power constraints of the slave device 44. If the enable count is not greater than or equal to (i.e., is less than) the enable threshold value NE, the method 54 returns to block 64 to continue to perform detection of the frame synchronization signal FSYNC. If the enable count is greater than or equal to the enable threshold value NE, the method 54 moves to block 68.

In block 68, the slave device 44 is enabled. As discussed above, the processor 50 enables the slave device 44 by instructing the TDM interface 52 to be powered on and operational. The method 54 then moves to block 60 in order to begin processing for disabling the slave device 44.

Figure 10:
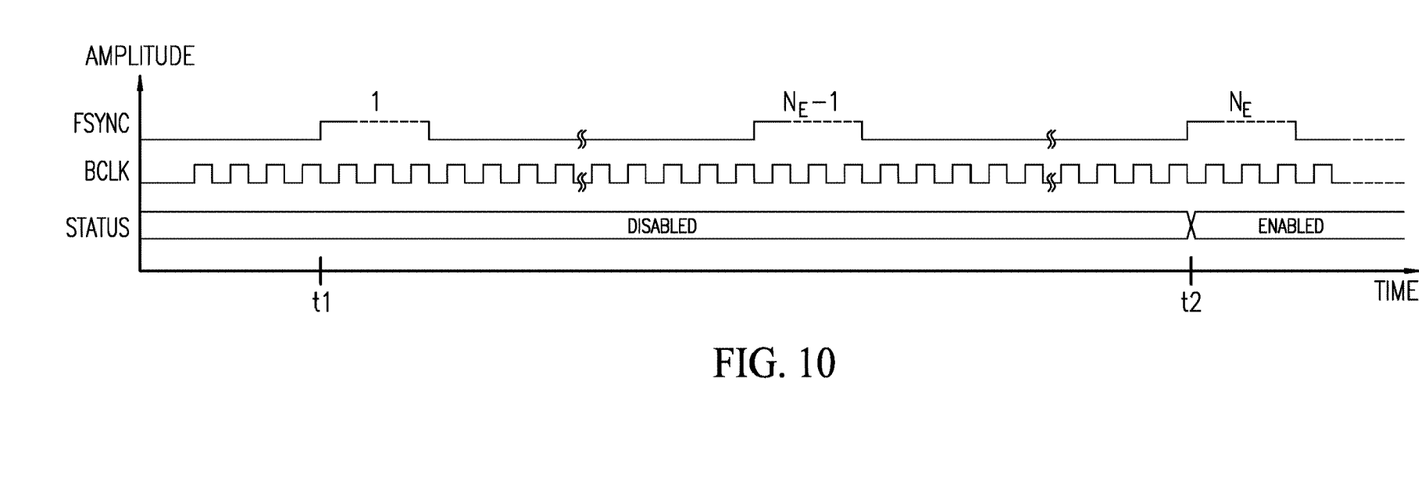
FIG. 10 is a timing diagram of a slave device being enabled according to an embodiment disclosed herein.

FIG. 10 is a timing diagram of the slave device 44 being enabled according to an embodiment disclosed herein. The vertical axis is an amplitude axis, and the horizontal axis is a time axis. The amplitude axis may have any type of amplitude unit (e.g., volts, amps, etc.), and the time axis may have any type of time unit (e.g., milliseconds, seconds, etc.).

At time t1, the slave device 44 receives the frame synchronization signal FSYNC from the master device 46, and the counter 48 detects the frame synchronization signal FSYNC (block 62). The counter 48 increments the enable count to count the frame synchronization signal FSYNC detected at time t1, and continues to perform detection of the frame synchronization signal FSYNC (block 64).

At time t2, the enable count is equal to the enable threshold value NE (block 66), and the slave device 44 is enabled (block 68).

Returning to FIG. 9, in block 60, the counter 48 sets or resets a disable count to zero. The disable count is used to track a total count of frame synchronization signal FSYNC absences, which is discussed above. The method then moves to block 70

In block 70, the counter 48 performs detection of the frame synchronization signal FSYNC at an expected time. That is, the counter 48 performs detection of absences of the frame synchronization signal FSYNC. As discussed above, the counter 48 is able to detect an absence of the frame synchronization signal FSYNC because the slave device 44 is synchronized with the frame synchronization signal FSYNC from the master device 46, and expects to receive the frame synchronization signal FSYNC periodically or at regular equal time intervals. As such, after detecting one frame synchronization signal, the slave device 44 expects another frame synchronization signal FSYNC at the next time interval. If the slave device 44 does not detect a frame synchronization signal FSYNC at the next time interval, the counter 48 detects and counts an absence of the frame synchronization signal FSYNC. Additionally, the slave device 44 knows the length of a frame of data. After detecting one frame synchronization signal FSYNC, the slave device 44 expects another frame synchronization signal FSYNC at the end of every frame of data. If the slave device 44 does not detect a frame synchronization signal FSYNC at the end of a frame of data, the counter 48 detects and counts an absence of the frame synchronization signal FSYNC.

If the frame synchronization signal FSYNC is detected at an expected time (i.e., the slave device 44 received the frame synchronization signal FSYNC from the master device 46 at an expected time), the method 54 returns to block 60. If the frame synchronization signal FSYNC is not detected at an expected time (i.e., the slave device 44 has not received the frame synchronization signal FSYNC from the master device 46 at an expected time), the method 54 moves to block 72.

In block 72, the counter 48 increments the disable count to count the frame synchronization signal FSYNC absence detected in block 70, and continues to perform detection of frame synchronization signal FSYNC absences. As discussed above, the disable count indicates a total count of frame synchronization signal FSYNC absences. If a frame synchronization signal FSYNC absence is not detected, the counter 48 continues to perform detection of frame synchronization signal FSYNC absences. If a frame synchronization signal FSYNC absence is detected, the counter 48 increments the disable count. The method 54 moves to block 74 after the disable count has been incremented.

In block 74, the processor 50 determines whether the disable count is greater than or equal to a disable threshold value ND. The disable threshold value ND may be configured based on power constraints of the slave device 44. If the disable count is not greater than or equal to (i.e., is less than) the disable threshold value ND, the method 54 returns to block 72 to continue to perform detection of the frame synchronization signal FSYNC absences. If the disable count is greater than or equal to the enable threshold value ND, the method 54 moves to block 76.

In block 76, the slave device 44 is disabled. As discussed above, the processor 50 disables the slave device 44 by instructing the TDM interface 52 to be powered off or enter a low power state. The method 54 then returns to block 58 in order to begin processing for enabling the slave device 44.

Figure 11:
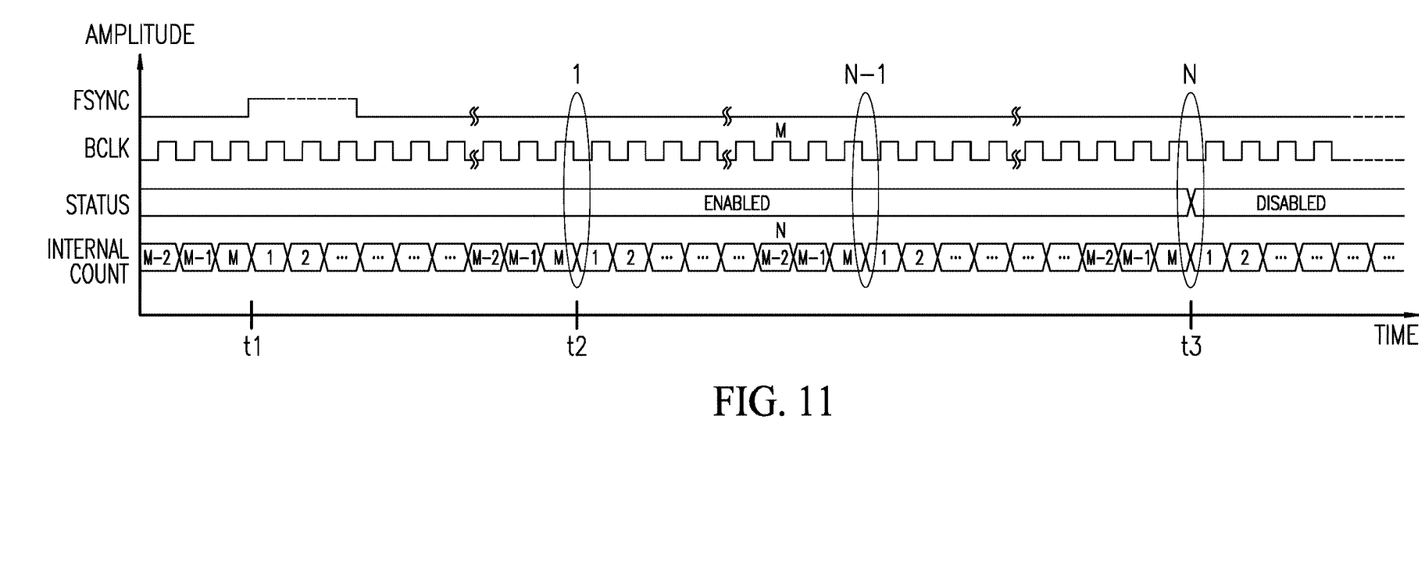
FIG. 11 is a timing diagram of a slave device being disabled according to an embodiment disclosed herein.

FIG. 11 is a timing diagram of the slave device 44 being disabled according to an embodiment disclosed herein. The vertical axis is an amplitude axis, and the horizontal axis is a time axis. The amplitude axis may have any type of amplitude unit (e.g., volts, amps, etc.), and the time axis may have any type of time unit (e.g., milliseconds, seconds, etc.). In the embodiment shown in FIG. 11, a frame of data is M bits long, where M is equal to any positive integer number (e.g., 128, 256, etc.).

At time t1, the slave device 44 receives the frame synchronization signal FSYNC from the master device 46, and the counter 48 detects a frame synchronization signal FSYNC. As such, the counter 48 expects another frame synchronization signal FSYNC every M bits starting from time t1.

At time t2, the slave device 44 does not receive a frame synchronization signal FSYNC from the master device 46 at the expected time (i.e., at end of the frame of data initiated at time t1), and the counter 48 detects a frame synchronization signal FSYNC absence (block 70). The counter 48 increments the disable count to count the frame synchronization signal FSYNC absence detected at time t2, and continues to perform detection of frame synchronization signal FSYNC absences (block 72).

At time t3, the disable count is equal to the disable threshold value ND (block 74), and the slave device 44 is disabled (block 76).

In the embodiments discussed above, the TDM interfaces of the slave devices 44 are enabled and disabled based on the frame synchronization signal FSYNC. However, components within the slave devices 44, in addition to the TDM interfaces, may also be enabled and disabled based on the frame synchronization signal FSYNC. For example, front end components and processors of each of the slave devices 44 may be enabled to be powered on and operational, and disabled to be powered off (or in a low power state) and non-operational based on the frame synchronization signal FSYNC.

The various embodiments disclosed herein provide a device including a sensor having a time division multiplexing (TDM) interface. The sensor transmits both raw data (e.g., acceleration measurements) and processed data (e.g., state information, interrupts, function results, etc.) in a single TDM signal by reserving one or more slots inside a TDM frame for transmission of the processed data. The sensor also embeds additional information inside a data stream of raw data by repurposing one or more of values of the raw data as an exception code, flag, or another type of notification. The device is also enabled to transmit data, and disabled when not in use in order to conserve power.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, by a sensor, measurement data having a maximum value and a minimum value;
generating, by the sensor, an exception code based on the measurement data;
generating, by the sensor, a time division multiplexing (TDM) signal that includes the exception code, the exception code having a value equal to at least one of the maximum value or the minimum value of the measurement data; and
outputting, by the sensor, the TDM signal.

2. The method of claim 1, further comprising:
generating, by the sensor, a plurality of exception codes based on the measurement data;
generating, by the sensor, a TDM signal that includes the plurality of exception codes, the plurality of exception codes includes a first exception code having a value equal to the maximum value of the measurement data and a second exception code having a value equal to the minimum value of the measurement data; and
outputting, by the sensor, the TDM signal that includes the plurality of exception codes.

3. The method of claim 2, further comprising:
selecting, by a multiplexer, between the measurement data, the first exception code, and the second exception code for transmission.

4. The method of claim 1 wherein the sensor is an accelerometer, and the measurement data includes an acceleration measurement.

5. The method of claim 1 wherein the exception code indicates an occurrence of an event, a status, or an error.

6. A device, comprising:
sensing circuitry configured to generate measurement data, the measurement data configured to have a plurality of values;
a processor configured to generate an exception code based on the measurement data; and
a time division multiplexing (TDM) transmitter configured to generate a TDM signal that includes the exception code, the exception code being equal to a value of the plurality of values.

7. The device of claim 6 wherein the exception code is equal to a maximum value of the plurality of values.

8. The device of claim 6 wherein the exception code is equal to a minimum value of the plurality of values.

9. The device of claim 6, further comprising:
a multiplexer configured to select between the measurement data and the exception code for transmission by the TDM transmitter.

10. The device of claim 6 wherein the sensing circuitry includes an accelerometer, and the measurement data includes an acceleration measurement.

11. The device of claim 6 wherein the exception code indicates an occurrence of an event, a status, or an error.

12. A method, comprising:
transmitting, by a master electronic device, frame synchronization signals;
receiving, by a slave electronic device, the frame synchronization signals, the slave electronic device including a time division multiplexing (TDM) interface; and
enabling or disabling, by the slave electronic device, the TDM interface based on a number of the frame synchronization signals received by the slave electronic device.

13. The method of claim 12, further comprising:
transmitting, by the slave electronic device, data to the master electronic device via the TDM interface in response to receiving a frame synchronization signal of the frame synchronization signals.

14. The method of claim 12, further comprising:
determining, by the slave electronic device, the number of the frame synchronization signals is greater than or equal to a threshold value; and
enabling, by the slave electronic device, the TDM interface in response to determining the number of the frame synchronization signals is greater than or equal to the threshold value.

15. The method of claim 12, further comprising:
determining, by the slave electronic device, a number of times a frame synchronization signal is absent at an expected time is greater than or equal to a threshold value; and
disabling, by the slave electronic device, the TDM interface in response to determining the number of times the frame synchronization signal is absent at the expected time is greater than or equal to the threshold value.

16. The method of claim 15 wherein the slave electronic device expects to receive the frame synchronization signal from the master electronic device at equal time intervals.

17. The method of claim 15 wherein the slave electronic device expects to receive the frame synchronization signal from the master electronic device after the master electronic device receives a frame of data.

18. A system, comprising:
a master electronic device configured to transmit a plurality of frame synchronization signals; and
a slave electronic device including a time division multiplexing (TDM) interface, the slave electronic device configured to receive at least one synchronization signal of the plurality of frame synchronization signals, the TDM interface being enabled or disabled based on the at least one synchronization signal.

19. The system of claim 18 wherein the TDM interface is enabled in case a total number of the at least one synchronization signal is greater than or equal to a threshold value.

20. The system of claim 18 wherein the TDM interface is disabled in case a number of times a synchronization signal of the plurality of frame synchronization signals is absent at an expected reception time is greater than or equal to a threshold value.

* * * * *